(No Model.) 5 Sheets—Sheet 1.

W. KOCH.
CASH INDICATOR AND REGISTER.

No. 428,679. Patented May 27, 1890.

Attest:
A. N. Jesbera.
E. M. Watson.

Inventor:
William Koch
By David A. N. Burr
Atty.

W. KOCH.
CASH INDICATOR AND REGISTER.

No. 428,679. Patented May 27, 1890.

(No Model.) 5 Sheets—Sheet 3.
W. KOCH.
CASH INDICATOR AND REGISTER.
No. 428,679. Patented May 27, 1890.
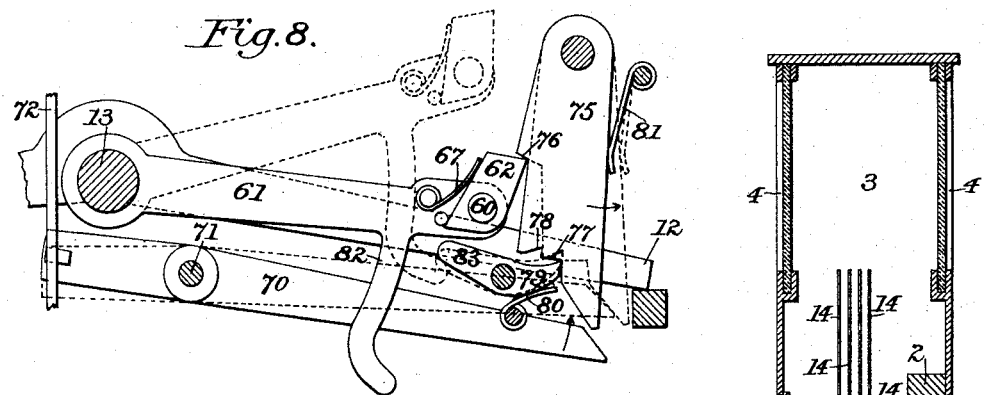
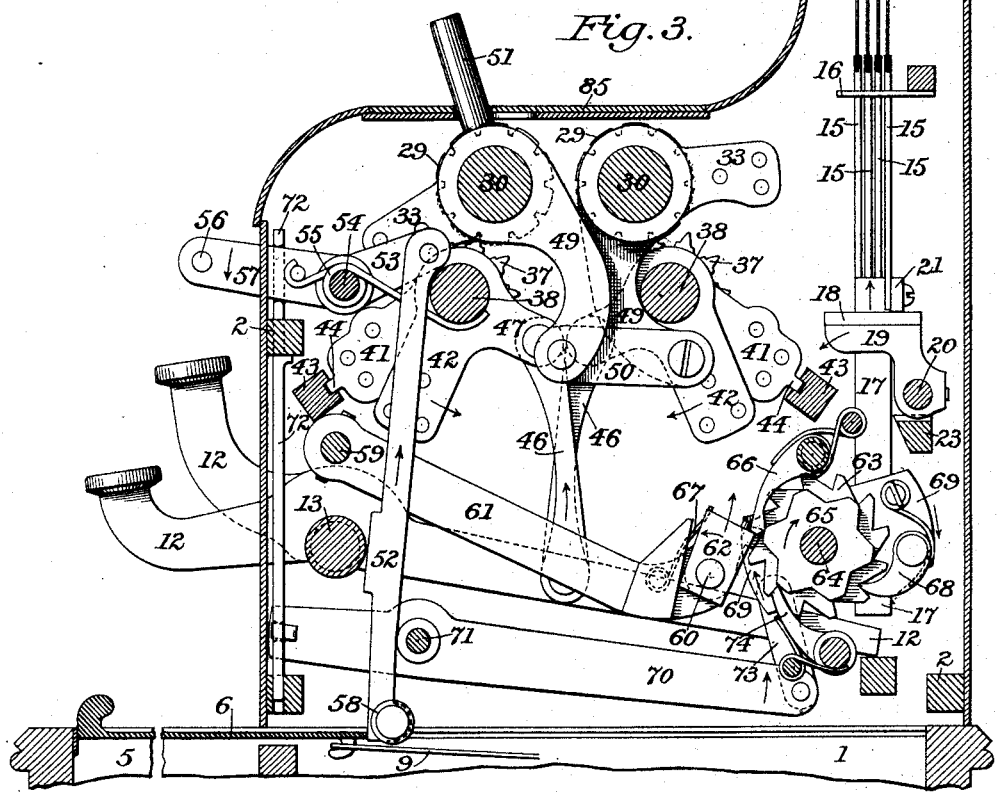
Attest:
A. N. Jesbera
E. H. Watson
Inventor:
William Koch
By David A. Burr
Atty.

(No Model.) 5 Sheets—Sheet 4.

W. KOCH.
CASH INDICATOR AND REGISTER.

No. 428,679. Patented May 27, 1890.

Attest:
A. N. Jesbera
E. H. Watson

Inventor:
William Koch
By David A. Burr
Atty.

(No Model.) 5 Sheets—Sheet 5.
W. KOCH.
CASH INDICATOR AND REGISTER.
No. 428,679. Patented May 27, 1890.
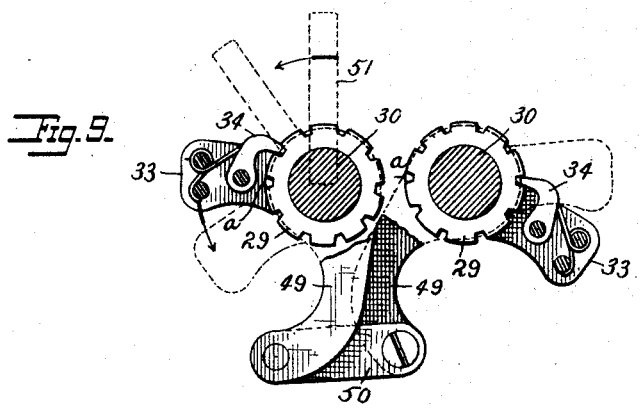
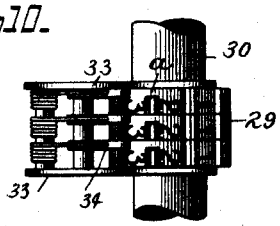
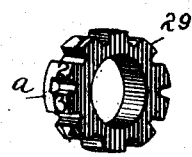
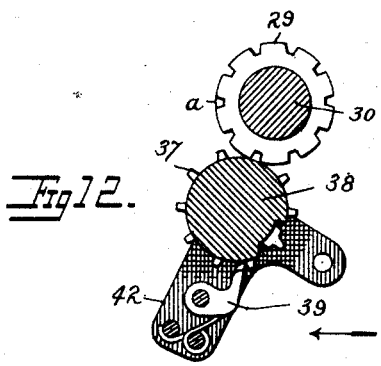
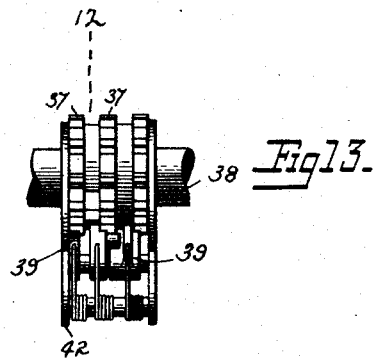
Witnesses
Inventor
William Koch
By his Attorneys

UNITED STATES PATENT OFFICE.

WILLIAM KOCH, OF NEW YORK, N. Y., ASSIGNOR TO THE KRUSE CHECK AND ADDING MACHINE COMPANY, OF NEW YORK.

CASH INDICATOR AND REGISTER.

SPECIFICATION forming part of Letters Patent No. 428,679, dated May 27, 1890.

Application filed November 23, 1888. Serial No. 291,669. (No model.)

*To all whom it may concern:*

Be it known that I, WILLIAM KOCH, of the city, county, and State of New York, have invented certain new and useful Improvements in Cash Receiving, Indicating, and Registering Machines; and I do hereby declare that the following is a full and exact description thereof, reference being had to the accompanying drawings, and to the reference-numbers marked thereon, making a part of this specification.

This invention relates to improvements in that class of cash receiving, indicating, and registering machines which are operated by a series of keys, and has for its object to simplify the construction and increase the efficiency thereof.

It consists in the novel construction and combination of the several devices embodied in the machine, as is hereinafter fully described and claimed.

Figure 1:
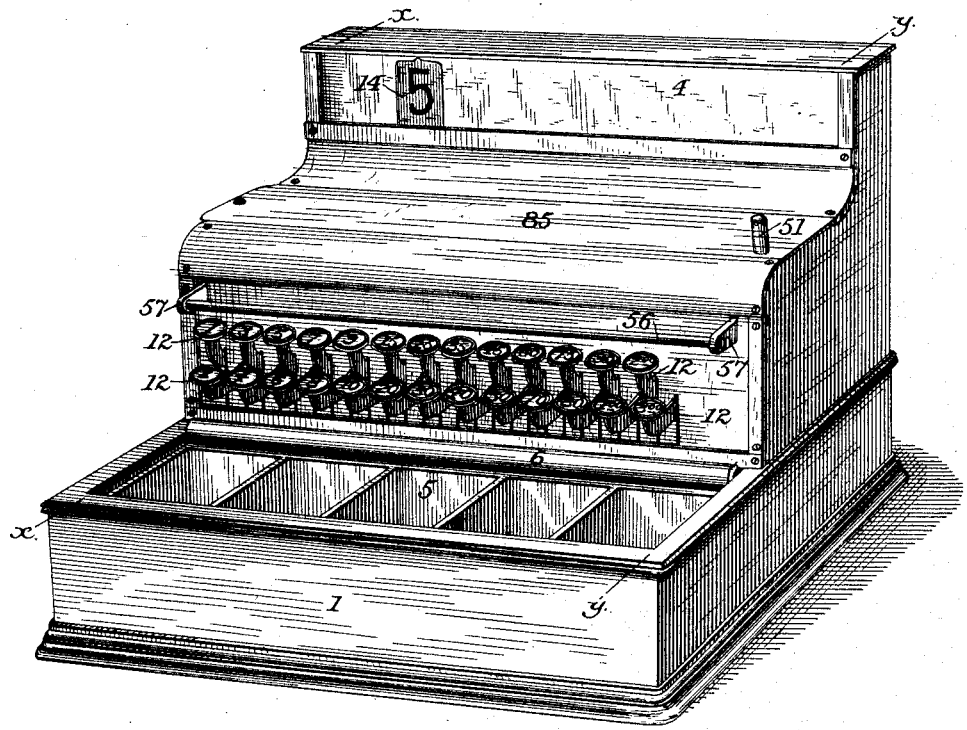
Figure 5:
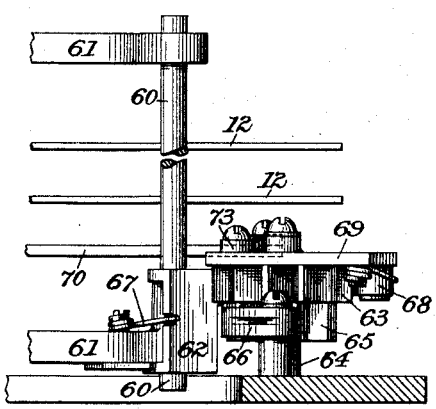
Figure 6:
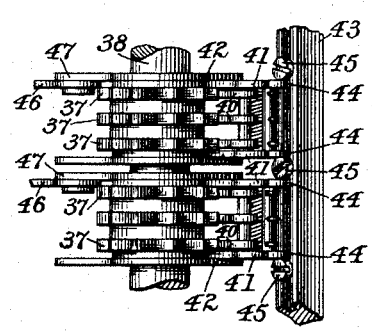
Figure 2:
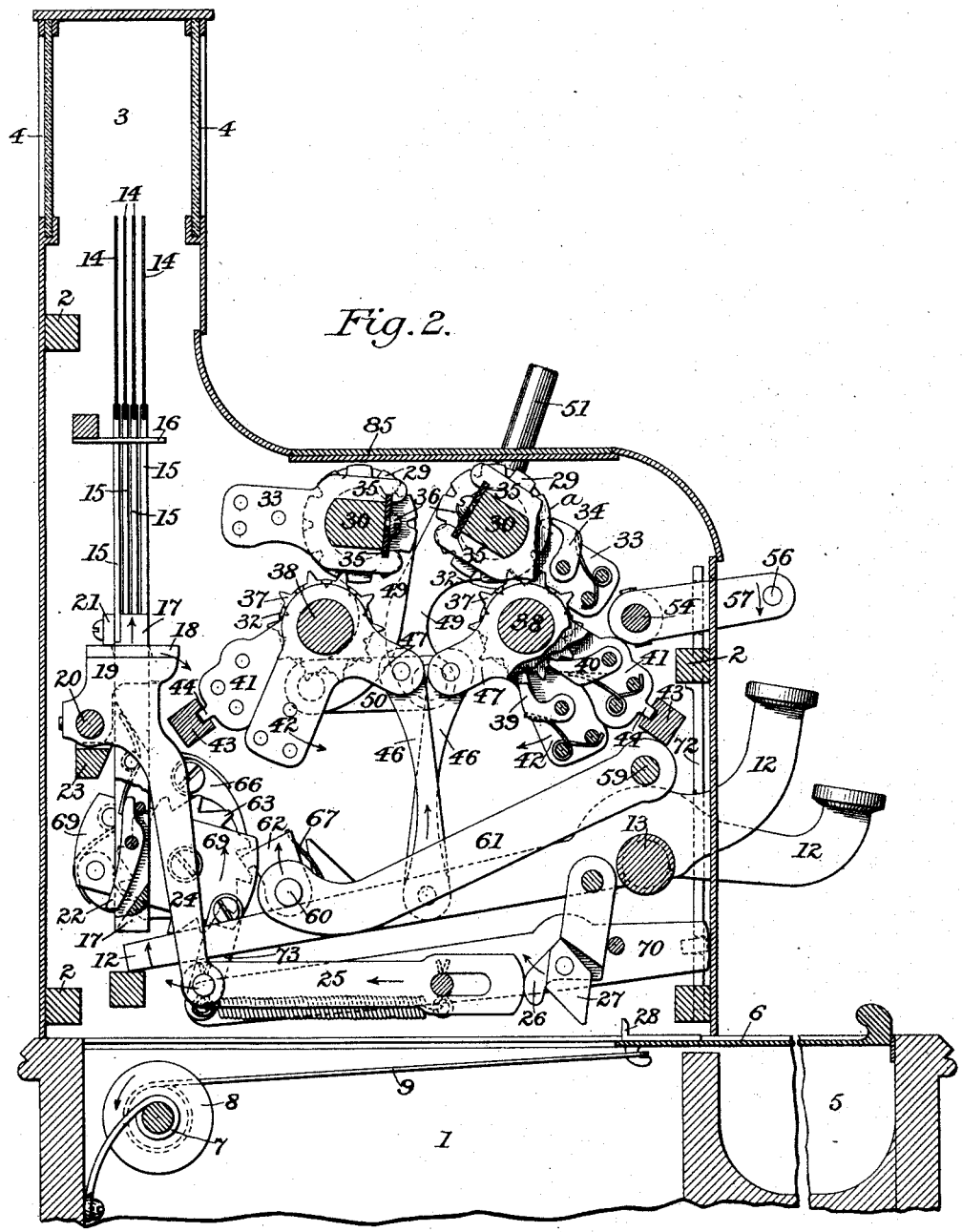
Figure 7:
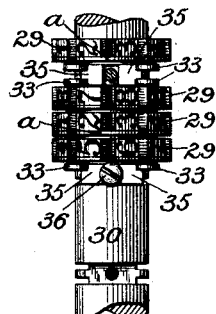
Figure 4:
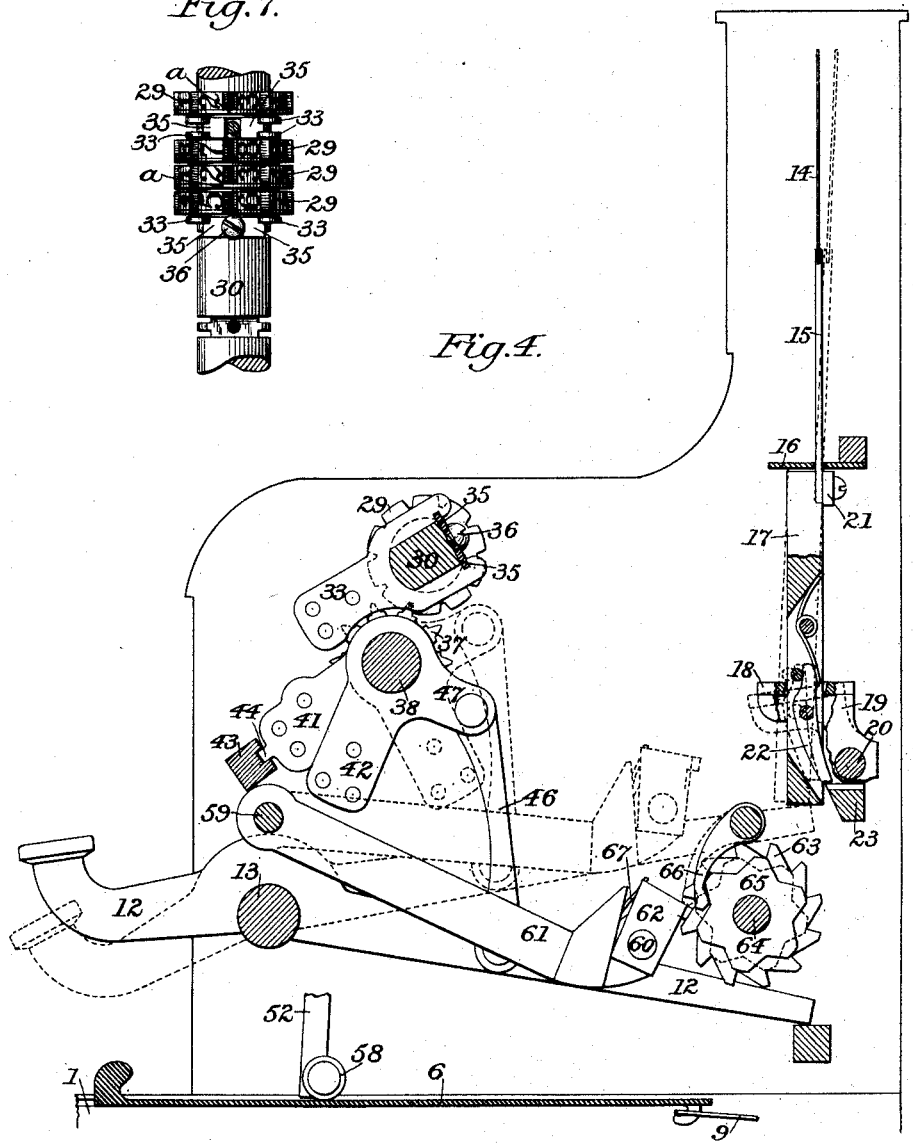

Figure 1 of the drawings is a view in perspective of my improved cash indicating and registering machine; Fig. 2, a vertical transverse section thereof just inside of the left-hand end of the machine in line $xx$ of Fig. 1, with the parts at the opposite end mainly omitted; Fig. 3, a similar section in line $yy$ of Fig. 1; Fig. 4, a section similar to Fig. 3, but illustrating merely the movements of the indicating and locking mechanism, all parts not needed for such illustration being omitted; Fig. 5, a detail plan of the swinging detent and of the wheels and dog combined therewith in the key-locking mechanism; Fig. 6, a detail plan embracing two sets of the pinions actuating the registering-wheels, illustrating more particularly the device for confining the frames in which the retaining-pawls are mounted; Fig. 7, a detail plan of a portion of one of the registering-wheel shafts, illustrating the manner of securing thereto the frames in which the pawls for the registering-wheels are mounted; and Fig. 8, a detail in elevation illustrating a modification in the mechanism for automatically locking the keys. Fig. 9 is a digrammatic sectional elevation of the registering-wheels, their restraining-pawls, and the means by which said registering-wheels are turned to bring the zero-point at the line of sight. Fig. 10 is a plan view of one set of said registering-wheels with their restraining-pawl and pawl-carrier. Fig. 11 is a perspective view of one of the registering-wheels. Fig. 12 is a sectional elevation of a registering-wheel and its actuating-pinion, the said section being taken on the line 12 of Fig. 13. Fig. 13 is a rear elevation of the actuating-pinions, their pawls, and pawl-frames, looking in the direction of the arrow, Fig. 12.

Similar numbers indicate like parts in all of the figures.

In its general form the machine is of the customary type, having an inclosed base 1, in which the cash-receptacle is formed or fitted, surmounted by a metallic frame 2, supporting the indicating and registering mechanism, and which is inclosed by a casing having an upper compartment 3, furnished with sight-openings 4 4 at front and rear for the display of the tablets.

The cash-receptacle may consist of a drawer, or, preferably, of a till 5, covered by a sliding lid 6, which is automatically opened by means of a spring and is closed by hand. This spring may consist of a coil 7, attached to a wheel or drum 8 and wound up by a chain or cord 9, carried at one end about the periphery of the wheel and attached at the other to the lid, as shown in Fig. 2; or it may consist of a flat spring fitted to be compressed when the lid is closed in manner as is well known to the art.

The indicating mechanism consists of the customary series of operating-keys 12 12, pivoted upon a longitudinal shaft 13, to actuate a corresponding series of tablets 14 14, mounted at the rear of the machine, each upon a vertical rod 15. Each tablet-rod 15 is led through a guide-aperture in a fixed transverse plate 16, mounted parallel with the rock-shaft 13, and is attached to the upper end of one of a series of longitudinally-slotted bars 17, fitted to play vertically through guide-apertures in an oscillating plate 18, mounted parallel with the fixed plate 16, and beneath it, upon end blocks 19 19, secured to a parallel rock-shaft 20. Each of the tablet-bars 17 is normally suspended from the plate 18 by means of a lateral plate or offset 21, projecting beyond the margin of the aperture through which the bar passes. The lower end of each of said tablet-bars 17 terminates just above the inner end of one of the keys 12, so as to be lifted by the play of the key. The tablet rods and bars may evidently be integral, and hereinafter each connected bar and rod will be included in the one descriptive term "tablet-rod." A spring-actuated catch 22 (see Figs. 2 and 4) is pivoted in the slot of each of said tablet-rods, so that whenever the rod is raised by the action of its key so as to bring the tablet 14, carried thereby, into view at the sight-openings 4 in the casing its lower end shall project automatically beyond the rear face of the rod to engage the edge of a transverse bar 23, fixed below the rock-shaft 20, parallel therewith, as shown in Fig. 4. As each tablet-rod 17 rises, its catch 22, bearing against the side of the transverse bar 23, will be thereby forced inwardly against the stress of its spring until the lower end of the catch passes above the top edge of the bar, when it will spring out, as shown in Fig. 4, to rest thereon, and thereby uphold the tablet. By oscillating the rock-shaft 20, and with it the plate 18, mounted thereon, the tablet-rods passing through said plate will all be swung back therewith far enough to carry the lower end of the catch 22 on each uplifted rod off of the transverse supporting-bar 23, thereby leaving the tablet-rod and tablet free to drop to its first position.

The rock-shaft 20 is oscillated automatically each time the lid 6 of the cash-receptacle is opened by means of an arm 24, depending from one of the end blocks 19, fixed on said rock-shaft, (see Fig. 2,) the lower end of said arm being brought into line with or pivoted to one end of a horizontal spring-actuated sliding bar 25, whose opposite end extends into position to be struck by a pivoted latch 26. This latch is fitted with a swinging trip-dog 27, depending in position to be engaged by a lug 28 on the lid 6, and this dog 27 is so pivoted to the latch as that when engaged and moved by the lug as the lid slides open it will carry the latch with it against the sliding bar 25 to move it forward. (See Fig. 2.) The latch by turning upon its center in said movement will be finally freed from the lug, which will then continue its forward movement with the lid. As the lug 28 returns and again strikes the latch while the lid is closing, the latch 27 will yield and allow the lug to pass freely under it. The opening of the lid of the cash-receptacle or of the cash-drawer is thus made to cause any tablets which may at the time be upheld in sight to drop automatically out of sight.

It is evident that instead of causing the tablet-rods to move back and clear the catches 22 from the fixed supporting-bar 23 the rods might, as an equivalent device, be made to move in fixed guide-plates, and the supporting-bar 23 be made to oscillate to and from the line of movement of the catches, so as to be swung back to clear the catches and allow the elevated tablet-rods to drop.

A separate counting or registering mechanism is provided for each key, and consists of a series of registering-wheels 29 29, each provided with a ratchet, as shown in Fig. 11, and actuated in the usual manner by the oscillation of a vibrating frame carrying pawls which are adapted to engage pinions geared with the wheels, the first wheel in each set being moved one step at each vibration of the frame, the second one step at each revolution of the first, the third one step at each revolution of the second, and so on, in any approved manner—as, for example, by causing the pawls by which the second and succeeding wheels are actuated to be held out of engagement with their ratchets, each by means of a disk or annular flange 32, Figs. 2, 12, and 14, formed upon the proximate side of the next preceding wheel, and having a single notch in its periphery to permit the pawl resting thereon to drop and engage its ratchet once and during a single step at each revolution of the disk.

The registering-wheels 29 29 are all mounted to rotate freely upon one of two shafts, hereinafter termed "oscillating shafts" 30 30, fitted in the upper part of the frame 2 of the machine parallel with the shaft 13, upon which the keys are hung or pivoted. Two shafts are employed in order to obtain compactness and to bring all the wheels in the smallest possible compass, the successive series of wheels for the successive keys being placed alternately in order on the one shaft and the other.

The several wheels in each set to be operated by each key are separately confined upon the common shaft 30, on which they revolve between two lateral plates, whose inner ends are forked to embrace the shaft and whose outer ends are united by transverse rods to constitute a carrier or frame 33, in which are pivoted, in the customary manner, the spring-actuated pawls 34, by which a reverse movement of the wheels is prevented. The fork of each lateral plate engages a slot cut circumferentially in the shaft 30, so as to prevent a lateral movement of the plates thereon, and each is confined in the shaft by means of two key-plates 35 35, (see Fig. 7,) fitting in a seat cut transversely in the slot in manner to allow the outer end of each key-plate 35 to enter a notch in the corresponding inner edge of the fork, the key-plates themselves being confined to the shaft and prevented from moving inwardly out of the notches in the fork by means of a central screw 36, interposed between their inner ends and screwing into the shaft, as shown in Figs. 2 and 7.

The actuating-pinions 37 37 for each set of registering-wheels are mounted upon shafts 38 38, fixed below the shafts 30 30, parallel therewith. Said pinions gear, severally, each with its appropriate numbering-wheel on the shaft above, and are governed to prevent a reverse movement thereof by restraining-pawls 40, which are mounted for each set in a separate frame 41, whose side plates embrace between them the corresponding set of pinions, and are secured to the axial shaft 38, upon which said pinions revolve. A second series of spring-actuated pawls 39 (see Figs. 2, 12, and 13) are mounted to actuate the same pinions in a second swinging frame 42, whose side plates are pivoted upon the same axial shaft 38 to swing freely thereon each outside of the side plates of the first frame 41. The frames 41, carrying the restraining-pawls 40, are severally fixed so as to be immovable by means of a longitudinally-slotted bar 43, fixed in the frame of the machine parallel with the shafts 30 and 38 in position to engage a lug 44, projecting from the outer end of each side plate of said frames 41, a lateral movement of the plates in the slot being prevented and the proper interval between the frames maintained by screws 45 45, inserted into the slot close by the lug, as shown in Fig. 6.

Each of the keys 12 is coupled to one of the swinging frames 42 by means of a link 46, pivoted to the key and to the outer end of an arm 47, projecting radially from the frame at about a right angle with the length of its side plates; hence each time a key is played the frame is oscillated far enough to move the first pinion in the series and the unit-numbering wheels geared thereto one step. Each complete revolution of the first pinion is made to move the next pinion one step, and one step only, this result being attained in the customary manner by the intervention of disks carried by each wheel upon whose periphery the actuating-pawls rest, each disk having a single notch in its periphery, adapted to permit the pawl resting thereon to drop into engagement with the next wheel in order, while the wheel carrying the disk makes a single step. This construction is fully illustrated in Figs. 12 and 13.

By mounting the registering-wheels upon the rock-shafts 30, to which the frames 33, carrying the restraining-pawls 34 for each set of wheels, are fixed, and omitting one of the series of notches in the ratchets $a^2$, engaged by said pawls, as illustrated in Figs. 2, 7, and 9 to 11, (see at $a$, Figs. 2 and 11,) so that at one step in the revolution of each wheel its restraining-pawl will not be permitted to enter a notch and come into play, the operator is enabled to bring all the registering-wheels 29 on each rock-shaft to a common zero-point at the line of sight by simply oscillating the shaft so as to cause the restraining-pawls 34 to operate as actuating-pawls to move the registering-wheels severally engaged thereby step by step until the pawls are successively brought upon the smooth faces of the part $a$ and thrown out of play, as above described, each wheel and pawl being so adjusted as that this end is attained when the zero on the wheel is at line of sight.

The two rock-shafts 30, carrying the registering-wheels, are coupled, so as to oscillate simultaneously, by means of two arms 49 49, (see Fig. 3,) depending severally therefrom to intersect each other, and whose lower ends are connected by a pivoted link 50; but said shaft 30 might be rocked independently to cause the registering-wheels to be turned to bring the zero-points at the line of sight.

A radial arm 51 is made to project outwardly through the casing of the machine from one of the shafts 30. By means thereof an oscillation of the shaft is readily effected when desired. It is held fast by means of the lid 85, (see Fig. 1,) which covers the sight-openings for the registering mechanism, and which is designed to be secured by a lock and key.

The locking mechanism for the lid 6 of the cash-receptacle 5 consists of an upright latch or bolt 52, whose lower end engages the rear edge of the lid when the lid is closed, so as to prevent it from opening, as shown in Fig. 3. This bolt is pivoted at its upper end to a radial arm 53, projecting horizontally from a rock-shaft 54, mounted above the series of keys 12 12 of the machine, parallel with the shaft 13, upon which they are hung or pivoted. The automatic engagement of the bolt 52 with the lid is enforced by means of a spring 55, and the oscillation of the rock-shaft 54 to unlock and release the bar from the lid may be effected whenever a key is played, or, in anticipation thereof, by means of a parallel lock-bar 56, mounted just above the outer ends of the upper series of keys, in close proximity thereto, upon the outer ends of two arms 57 57, projecting radially from said rock-shaft 54, so that a downward pressure upon the lock-bar 56 at any point in its length will operate to lift the bolt 52 against the stress of its spring, and thereby unlock and release the lid, leaving it free to spring open automatically under the action of its spring 7. A friction-roller 58 is fitted laterally upon the end of the bolt, so that its periphery shall project below said end and bear and ride upon the top of the lid as the latter in opening moves back under it, as shown in Fig. 4, whereby any movement of the lock-bar is presented so long as the lid is open.

The locking mechanism for the keys and tablets embraces a rod 60, resting transversely upon the inner ends of the series of keys 12 12, and which is secured at either end to vibrating arms 61 61, pivoted to a parallel rod 59, mounted above the shaft 13, upon which the keys are hung or otherwise upon the key-shaft 13, or upon equivalent stud-pins projecting from each end of the framing or casing. By locking said rod 60 each key in the entire series is locked, and, conversely, the play of any one of said keys will operate to lift the rod. A block 62, which may be fixed to the rod 60, but is preferably a spring-actuated pawl block or detent 62, is pivoted upon one end of said key-locking rod 60, and it is made by means of its spring 67 to engage automatically a ratchet-wheel 63, pivoted upon a stud-pin 64, projecting from the frame of the machine, so that each time the rod is lifted by the play of a key it will move said ratchet-wheel one step. This ratchet-wheel 63 is governed in the customary manner to prevent a reverse movement by a spring-actuated pawl 74, pivoted to the casing. (See Fig. 3.) A star-wheel 65, preferably of smaller diameter than the ratchet-wheel 63 and having one-half as many notches, is secured laterally thereto to revolve with it upon the same axis 64. The face of the detent 62, engaging the ratchet-wheel, is made wide enough to overlap also the notched periphery of the star-wheel, (see Fig. 5,) and a swinging dog 66 is pivoted above said star-wheel to swing automatically into engagement with its periphery under the face of said detent. The length of radius of the teeth of the star-wheel 65 and the thickness of the dog 66 are so proportioned as that when the dog rests upon one of said teeth its outer end shall project far enough to overlap the edge of the detent 62, and thereby prevent any movement thereof, so as to produce a lock upon the key-rod 60 and the keys on which it rests, so long as the dog remains in said position; but when the dog drops into one of the interdental notches of the star-wheel the detent and its rod 60 are left free to swing upward when actuated by the play of any one key and to move the ratchet and its star-wheel one step as the tablet is lifted by the key.

The ratchet-wheel 63 is actuated not only by the pawl-block 62 upon the transverse rod 60, resting upon the keys, but also by a second pawl 68, mounted in a swinging frame 69, (see Fig. 3,) pivoted upon the axis of the ratchet-wheel, and said frame is oscillated each time the lock-bar 56 is depressed to release the cash-lid 6 by means of a horizontal lever 70, pivoted at 71, whose front end is coupled to one arm 57 of the lock-bar 56 by a link 72, and whose rear end is coupled to the swinging pawl-frame 69 by a link 73; hence when the keys are locked by the engagement of the detent 62 with the end of the dog 66 they can only be released by a movement of the lock-bar 56 operating to release the cash-lid, so that it shall fly open. This movement of the lock-bar 56, by oscillating the lever 70, will cause the pawl-frame 69 to swing far enough to move the ratchet-wheel one step, and thereby bring a notch of the star-wheel into register with the dog, so that the latter, swinging into the notch, will clear the detent and leave it free to engage the tooth of the ratchet, and also to move upward, and thereby free the keys, as shown in Fig. 4. If now a key be played, it will lift the detent and in so doing will move the ratchet-wheel another step, and this movement will again swing the dog outward upon the end of a tooth of the star-wheel, as shown by dotted lines in Fig. 4. As the detent drops with the key-rod 60, it will slide over the outer face of the projecting dog, and will be thereby turned inward upon its axis against the stress of its spring 67 until it has dropped below the end of the dog, when it will be carried by the action of the spring out again under said end, to be locked thereby as before. (See Fig. 3.)

A modification of the devices for producing the self-locking of the keys as soon as the play of any one of them is completed by means of a detent 62 is illustrated in Fig. 8 of the drawings. In this case the oscillating dog 66 is replaced by an oscillating dog or latch 75, pivoted to swing to and from the face of the detent 62. This latch 75 is provided on its front face with a shoulder or an offset 76, adapted to engage the detent when the arm 61, which carries it, is depressed, as shown in Fig. 8. The latch is also formed with a deep re-entrant angle or offset 77 upon the same face below the offset 76, the upper face of said recess having a notch 78 therein, adapted to engage the end of the pawl 79, pivoted to the frame or casing of the machine and held up against said face by a spring 80. This pawl serves as a stop to prevent the forward movement of the latch 75 when the detent 62 is lifted above the latch, as shown in dotted lines, Fig. 8. It is automatically carried and held against the stop or the detent by means of a spring 81 bearing against its rear face.
Its lower end is extended below the pawl 79, and the front face of this extension is inclined rearwardly, forming a bevel, against which a counterpart bevel on the end of the lever 70 is brought to bear as the latter is elevated, in manner as described, by a play of the lock-bar 56, (see Fig. 3,) so that the movement of said lever 70 will operate to swing back the latch 75 far enough to permit the pawl 79 to engage the notch 78 and hold it, and to release the shoulder 76 from its engagement with the detent 62, so that the latter will be free to move upward.

A bent finger 82 is made to project from the lower edge of the arm 61, carrying the detent in position to engage as said arm is elevated (see dotted lines, Fig. 8) a radial extension 83 of the pawl 79, and thereby trip said pawl, so as to release it from the notch 78 in the latch and allow the latch to swing forward again under the stress of the spring 81. As the detent 62 drops back again, it will slide over the inclined face of the latch, and will be thereby turned inward until it has dropped below the offset 76 in the latch, when under the stress of its spring 67 it will spring out again under said offset to be locked thereby. The keys 12 12 are thus all automatically locked by means of the rod 60 and detent 62, so that no one of them can be moved when the cash-receptacle is closed, and are set free to permit them to be moved so soon as it is opened and until one of them has been played, whereupon they all become again locked, and must so remain until the cash-receptacle has been closed and again opened, the opening of the cash-receptacle operating invariably to drop the tablets displayed by the last play of the keys. At the same time, when the cash-receptacle is open and the keys are consequently free, two or more keys may be played before the keys all become locked, so long as the first key played is held so as to uphold with it the key-rod 60 and prevent the detent thereon from dropping under the dog 66.

While the movement of the key is controlled by that of the lid of the cash-receptacle, the movement of the latter is wholly independent of that of the keys and is at no time controlled thereby.

In the use of the machine, when the cash-receptacle is closed, the keys are all locked, with the tablet indicating the amount last registered elevated, and neither the tablet nor any of the keys can be moved so long as the cash-receptacle remains closed. Upon the receipt of a cash payment to be deposited in the receptacle the operator bears upon the lock-bar 56 above the keys. This movement releases the lid of the cash-receptacle, so that the lid will fly open, and in opening it will cause the rock-shaft 20 to oscillate, and thereby free the uplifted tablet, so that it will drop to its normal position. The movement of the lock-bar will also simultaneously actuate both the ratchet-wheel 63 and its connected star-wheel 65 one step, thereby releasing the lock upon the key-rod 60 and liberating the key confined thereby. Any one of the keys 12 may now be played to indicate the amount paid in. By playing a key the ratchet and star wheels are moved one more step, bringing the locking-dog in position to engage the pawl on the key-rod. At the same time the tablet corresponding to the key is lifted and the registering-wheels are actuated. When the indicating-tablet is thus elevated into sight, it is automatically upheld after the key drops back to its first position by the catch 22. As the key drops back, and with it the key-rod 60, the pawl on the key-rod passes under the end of the dog and becomes once more locked, so as to confine the keys. Thus after each key has been played it locks itself as well as all the other keys, and so remains until released by an independent movement, such as the opening of the cash-receptacle or the vibration of a separate lock-bar or other device.

The lid of the cash-receptacle may be closed by hand, and when closed is automatically caught and locked by the bolt 52, so that it may not again be opened otherwise than by a movement of the lock-bar 56. The entire machine may then be secured by a padlock or other well-known locking device applied to the bar 56, or either of its arms, to prevent a movement thereof.

It is evident that a sliding drawer may be used instead of a stationary till having a sliding lid, and that the operation thereof in connection with the remaining parts of the machine will be substantially the same as described, the actuating-connections between the drawer and said parts being made to operate in a reverse order in manner as will suggest itself to any skilled mechanic, and which need not herein be set forth in detail.

It is evident that the lock-bar 56 may be placed under the keys, to be operated by their depression, instead of independently thereof, as illustrated, in which case it will be necessary to allow a slight loss of motion between the keys and the key-rod 60, so that the lock-bar shall be moved by the play of the keys in advance of the movement of the key-rod thereby; also, that by allowing a slight loss of motion between the key-rod 60 and the detent 62, moved thereby, the bolt 52 and the lever 70, connected to move in unison therewith and actuate the pawl 68, may be coupled directly to said key-rod 60, to be actuated thereby before the rod actuates the detent in making a single continuous movement.

I claim as my invention—

1. In an indicating-machine, the combination of a key, a reciprocating tablet-rod, a detent carried by the rod, a supporting-bar, and means for vibrating the tablet-rod connected with a moving part of the machine, whereby to release the detent from the bar, substantially as described.

2. In an indicating-machine, the combination of a key, a reciprocating tablet-rod, a spring-actuated detent carried by said tablet-rod, a supporting-bar with which the detent engages, and means connected with a moving part of the machine for disengaging the detent from the bar, substantially as described.

3. In an indicating-machine, the combination of a plurality of keys and a plurality of tablet-rods to be moved thereby, a spring-actuated detent carried by each tablet-rod, a supporting-bar engaged by the detent, a movable plate contacting with the tablet-rods, and connections between said plate and a cash-receptacle to vibrate the tablet-rod and release its detent from the supporting-bars, substantially as described.

4. The combination, in a cash-machine, of the longitudinally-reciprocating vertical tablet-rods, the fixed guide-plate through which the upper ends of the rods severally pass, the movable guide-plate through which their lower ends pass, the supporting-bar fixed below said movable guide-plate parallel therewith, and the spring-actuated catches pivoted to the tablet-rods for engagement with the supporting-bar, whereby the tablets when elevated are upheld by the catches until the tablet-rods are oscillated by a movement of the lower guide-plate, substantially in the manner and for the purpose herein set forth.

5. The combination, in a cash-machine, of a series of keys pivoted on a transverse shaft, a series of tablet-rods and indicating-tablets operated by said keys, a fixed guide-plate through which the upper ends of the tablet-rods severally pass, a lower movable guide-plate through which their lower ends pass, catches pivoted to the rods to spring outwardly therefrom below the movable guide-plate, and a transverse supporting-bar mounted below said guide-plate in position to be engaged by the outwardly-projecting end of the catch on any one of said rods, whereby when the tablet-rod is elevated by a movement of its key it is upheld upon the supporting-bar and when thereafter moved by the movement of the lower guide is disengaged from the bar and allowed to drop, substantially in the manner and for the purpose herein set forth.

6. The combination, in a cash-machine, of the longitudinally-reciprocating vertical tablet-rods, the fixed guide-plate through which the upper ends of the rods severally pass, the movable guide-plate through which their lower ends pass, the parallel rock-shaft upon which said movable guide-plate is mounted, the supporting-bar fixed below said oscillating guide-plate parallel therewith, a spring actuating the rock-shaft to carry the guide plate and rods automatically toward the supporting-bar, and the spring-actuated catches pivoted to project outwardly from the tablet-rods below said bar, whereby as the rods are moved upwardly they will be held against the face of the supporting-bar, causing the catches to yield inwardly until they pass the upper edge of the bar and by an oscillation of the rock-shaft are carried back to release the catches from said edge, all substantially in the manner and for the purpose herein set forth.

7. The combination, in a cash-indicating machine, of a cash-receptacle, a movable cover therefor, a series of keys pivoted on a transverse shaft, a series of tablet-rods and indicating-tablets operated by said keys, a supporting-bar for the tablets, automatic catches carried by said rods to engage the supporting-bar and uphold the rods when elevated, and an oscillating plate governing the catches and coupled mediately to the sliding cover, whereby the movement of the cover in opening the cash-receptacle will operate to disengage the catches from the supporting-bar, substantially in the manner and for the purpose herein set forth.

8. The combination, in a cash-machine, with its cash-receptacle and a series of keys pivoted on a transverse shaft, of a series of tablet-rods and indicating-tablets operated by said keys, catches carried by said rods, a transverse supporting-bar automatically engaged by said catches when either rod is elevated, an oscillating plate engaging the rods to move them and clear their catches from the supporting-bar, a rock-shaft carrying said plate, an arm projecting from the rock-shaft, a spring-actuated sliding plate coupled to said arm to hold it in its normal position, a pivoted latch swinging into contact with the free end of said sliding plate, a sliding lid covering the cash-receptacle, a lug upon said lid, and a swinging trip-dog depending from the catch to be struck by the lug as the lid opens and carry with it the latch and sliding plate until freed by the oscillation of the latch, and to yield and allow the lug to pass freely back on its return, substantially in the manner and for the purpose herein set forth.

9. The combination, in a cash-machine, of a key, a self-opening cash-receptacle, an automatic bolt locking the same when closed, and an outer horizontal vibrating bar extending transversely in front of the machine and coupled to said bolt to actuate it independently of the key, whereby a depression of the rod will unlock the bolt, substantially in the manner and for the purpose herein set forth.

10. The combination, substantially as described, in a cash-machine, of a cash-receptacle, a spring-actuated lid therefor, and a bolt mounted to move into locking engagement with the lid when it is closed and to be held immovable thereby when it is open, substantially in the manner and for the purpose herein set forth.

11. The combination, in a cash-machine, with its series of operating-keys and a transverse rod resting thereon to be elevated by the movement of any one of them, of a detent carried thereby and an independent locking-dog moved mediately by the upward movement of the rod into position to engage its detent as the rod drops to its normal position, whereby all the keys are automatically locked after the movement of any one of them is completed, substantially in the manner and for the purpose herein set forth.

12. In an indicating-machine, the combination of a plurality of keys, a locking-rod adapted to be moved by the keys and bearing a dog or block, a locking mechanism in the path of said dog and actuated thereby to lock said dog when it returns to its normal position, and an unlocking device connected with the moving part of the machine independent of the keys to set the locking mechanism in position to permit further movement of the locking-rod, substantially as set forth.

13. The combination, in a cash-machine, of a vibrating key 12, a parallel vibrating arm 61, operated thereby to move in unison therewith, a detent pivoted to said arm to move therewith and oscillate thereon, a cash-receptacle, a cover therefor, a locking-bolt engaging said cover, a lever actuated by the movement of said bolt, and a movable locking-dog carried mediately by the upward play of the detent-arm into position for engagement with said detent as the arm descends and disengaged therefrom by the movement of said lever, substantially in the manner and for the purpose herein set forth.

14. The combination, in a cash-machine, with its operating-keys and a vibrating rod actuated whenever any one of the keys is operated, of a pivoted detent moving with said rod, a ratchet-wheel engaged and moved by the detent, a star-wheel revolving in unison with said ratchet and having one-half as many notches, and a dog engaging the periphery of said star-wheel and adapted when resting upon a tooth thereof to engage and lock said detent, substantially in the manner and for the purpose herein set forth.

15. The combination, in a cash-machine, with its cash-receptacle, mechanism for closing and locking the same, its operating-keys, and a vibrating rod actuated whenever any one of the keys is operated, of a pivoted detent moving with said rod, a ratchet-wheel engaged and moved forward by the detent, a star-wheel revolving in unison with said ratchet and having one-half as many notches, a dog engaging the periphery of said star-wheel and adapted when resting upon a tooth thereof to engage and lock said detent, an actuating-pawl engaging said ratchet-wheel to move it forward, and mechanism actuating said pawl independently of the movement of the keys, substantially in the manner and for the purpose herein set forth.

16. The combination, in a cash-machine, with a series of operating-keys, a transverse rod vibrating upon pivoted arms and resting upon the keys to be lifted when any one key is operated, a self-closing cash-receptacle, and a bolt to lock the same, of a ratchet-wheel at one end of said vibrating rod, a star-wheel having half as many notches as the ratchet-wheel and mounted to revolve with it, connecting mechanism between the lock-bolt and said ratchet-wheel, whereby each movement of the bolt will turn the wheels forward one step, a swinging dog resting upon the periphery of the star-wheel to drop into its interdental notches, and a detent pivoted to the vibrating rod in position to engage the ratchet and turn it forward one step at each movement of the frame and to drop under the dog and be locked thereby when the dog rests upon a tooth of the star-wheel, substantially in the manner and for the purpose herein set forth.

17. The combination, in a cash-registering machine, of a rocking shaft, a series of toothed registering-wheels revolving thereon and each bearing the digits and cipher upon its toothed periphery, a corresponding series of actuating-pinions mounted upon a parallel shaft and geared with said registering-wheels, a ratchet carried by each wheel and having notches to correspond with all but one of its interdental notches, a pawl-frame secured to the rocking shaft to oscillate therewith, and pawls mounted in said frame to engage the interrupted ratchets of the registering-wheels, substantially in the manner and for the purpose herein set forth.

18. The combination, with the rocking shaft 30 and each set of registering-wheels 29, mounted thereon, of a pawl-frame 33, having lateral plates embracing the wheels and forked to embrace the shaft, parallel transverse slots or grooves formed in the shaft to receive the edges thereof, key-plates 35 35, seated transversely on the shaft in pairs to engage with their outer ends notches in the forked ends of the lateral plates, and a confining-screw 36, interposed between the inner ends of said key-plates, substantially in the manner and for the purpose herein set forth.

19. The combination, with the toothed registering-wheels 29 and the oscillating shaft 30, upon which they are mounted, of the parallel shaft 38, the pinions 37, revolving thereon and geared to the registering-wheels, the pawl-frame 41, hinged upon said shaft 38, the restraining-pawls mounted in each frame to govern said pinions, and the longitudinally-slotted bar 43, mounted parallel with the shaft 38 to engage terminal lugs 44 on the side plates of each pawl-frame, substantially in the manner and for the purpose herein set forth.

20. The combination, with the shaft 38, the pinions 37, mounted thereon to actuate the registering-wheels, the pawl-frames hinged upon said shaft, and the longitudinally-slotted bar mounted parallel with the shaft to engage terminal lugs 44 on the side plates of each pawl-frame, of the confining-screws 45 45, entering said slots outside of each side plate, whereby a lateral movement of the frame upon the bar is prevented, substantially in the manner and for the purpose herein set forth.

21. The combination, in a cash-registering machine, of the parallel rocking shafts 30 30, the toothed registering-wheels 29, mounted upon said shafts, the interrupted ratchets upon each wheel, the pawl-frames 33 33, embracing each set of registering-wheels and secured to the rocking shafts, pawls 34, mounted in said frames to engage said ratchets, pinions 37, severally geared to each registering-wheel, the curved arms 49, projecting from the two shafts, and the interposed coupling-link 50, pivoted to each arm, substantially in the manner and for the purpose herein set forth.

22. The combination, in a registering-machine, of a rock-shaft, a registering-wheel mounted thereon and means for rotating it, a pawl-carrying frame rigidly connected to said shaft, and means for rocking said shaft to cause the pawl to act as supplemental means to rotate the registering-wheel, substantially as described.

23. The combination of a plurality of registering-wheels provided with ratchets having smooth faces $a$ for operating said wheels, a frame carrying pawl restraining the rotation of said wheels, and means for moving the frame to cause the pawls to engage the ratchets to rotate the wheels, substantially as described.

24. The combination of a plurality of registering-wheels, means for rotating said wheels in one direction, a frame carrying pawls restraining the rotation of said wheels, and means for moving the frame to cause the pawls to rotate the wheels back to their initial position, substantially as described.

25. The combination, in a cash-register, of a movable lid, a series of keys, a lock for locking the keys connected with the lid-actuating devices to unlock the keys as the lid is released, and other connections with the key-lock to move and lock the keys after the operation of any one of the same, substantially as set forth.

26. The combination, in a registering-machine, of two rock-shafts, a registering-wheel mounted upon each rock-shaft, a pawl engaging each of said wheels, a frame for each pawl and secured to each shaft, a coupling device between said shafts, and means for rocking said shafts, substantially as described.

27. The combination, in a registering-machine, of two rock-shafts, a plurality of registering-wheels mounted to turn loosely on each shaft, a frame rigidly secured to each shaft carrying pawls engaging with said registering-wheels, a coupling device coupling the shafts together, and means for rocking the shaft, substantially as described.

28. The combination, in a registering-machine, of two rock-shafts, the plurality of registering-wheels mounted to turn loosely on each shaft, a frame rigidly secured to each shaft carrying pawls engaging with said registering-wheels, two arms and a link coupling the shafts together, and means for rocking the shaft, substantially as described.

29. The combination of a plurality of registering-wheels and actuating-pinion engaging therewith, a vibrating pawl-carrying frame, and a notched hub carried by one of the actuated pinions and in the path of one of the pawls, whereby when the notch arrives under the pawl it is caused to engage with the contiguous pinion, substantially as described.

In testimony whereof I have signed my name to this specification in the presence of two subscribing witnesses.

WILLIAM KOCH.

Witnesses:
  A. N. JESBERA,
  E. M. WATSON.